United States Patent [19]

Franke

[11] 4,259,702
[45] Mar. 31, 1981

[54] FRONT-LOADING CASSETTE TAPE MACHINE

[75] Inventor: Wolfgang Franke, Langen, Fed. Rep. of Germany

[73] Assignee: Braun Aktiengesellschaft, Frankfurt am Main, Fed. Rep. of Germany

[21] Appl. No.: 41,402

[22] Filed: May 21, 1979

[30] Foreign Application Priority Data

May 24, 1978 [DE] Fed. Rep. of Germany ....... 2822584

[51] Int. Cl.³ ................. G11B 15/18; G11B 15/26; G11B 23/04
[52] U.S. Cl. .................... 360/96.5; 360/93; 360/96.3
[58] Field of Search ............ 360/96.5, 96.1–96.4, 360/137, 93, 94; 312/7 R, 8, 12, 20, 184

[56] References Cited

U.S. PATENT DOCUMENTS

| 3,996,618 | 12/1976 | Suzuki | 360/93 |
| 4,044,391 | 8/1977 | Takahashi | 360/93 |
| 4,087,844 | 5/1978 | Takahashi et al. | 360/93 |

FOREIGN PATENT DOCUMENTS 44-21702 9/1969 Japan ..................... 360/96.5

Primary Examiner—Alfred H. Eddleman
Attorney, Agent, or Firm—Michael J. Striker

[57] ABSTRACT

A cassette tape machine has a cassette receiver in form of a drawer which pulls out from the front panel of the machine, so that the cassetts may be placed into it from above in flat condition even if the top surface of the machine itself is inaccessible. The capstan drive, preferably a direct drive, is mounted in the cassette receiver, immediately below the cassette nest, so that no variations in the tape speed—resulting in wow and flutter—are introduced by the need to transmit motion to the capstan from a remote location of the drive.

4 Claims, 6 Drawing Figures

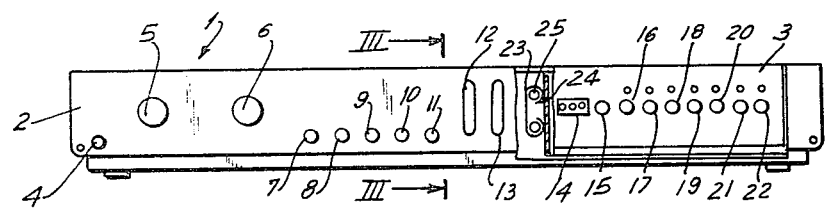
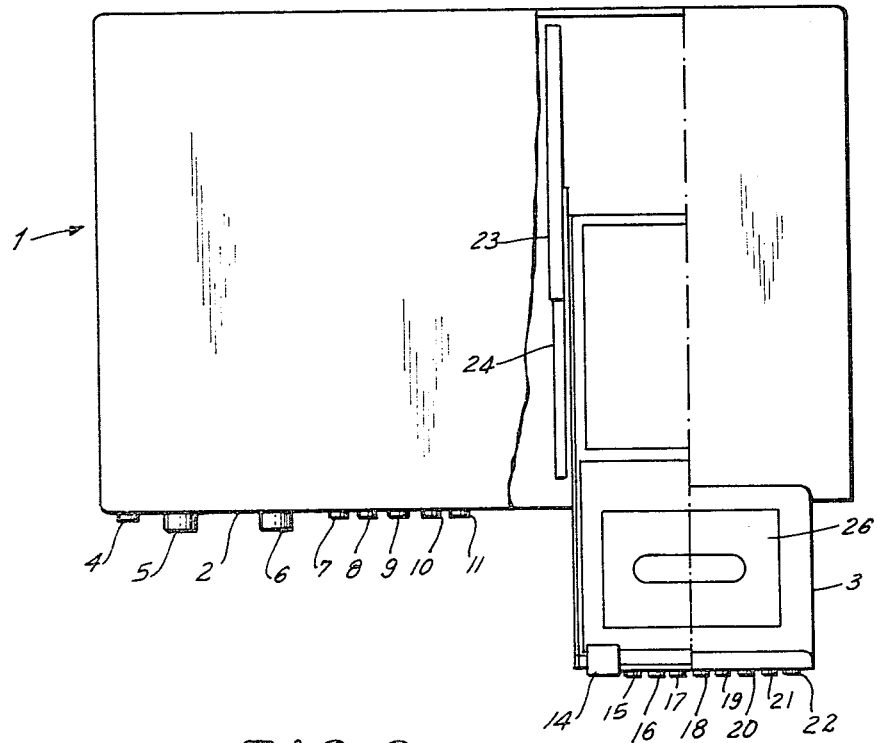

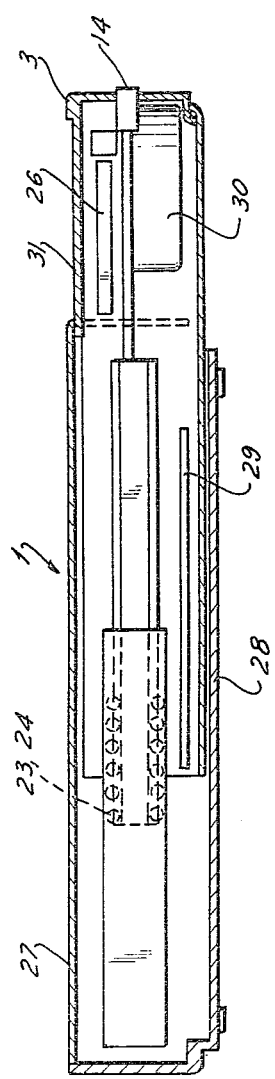

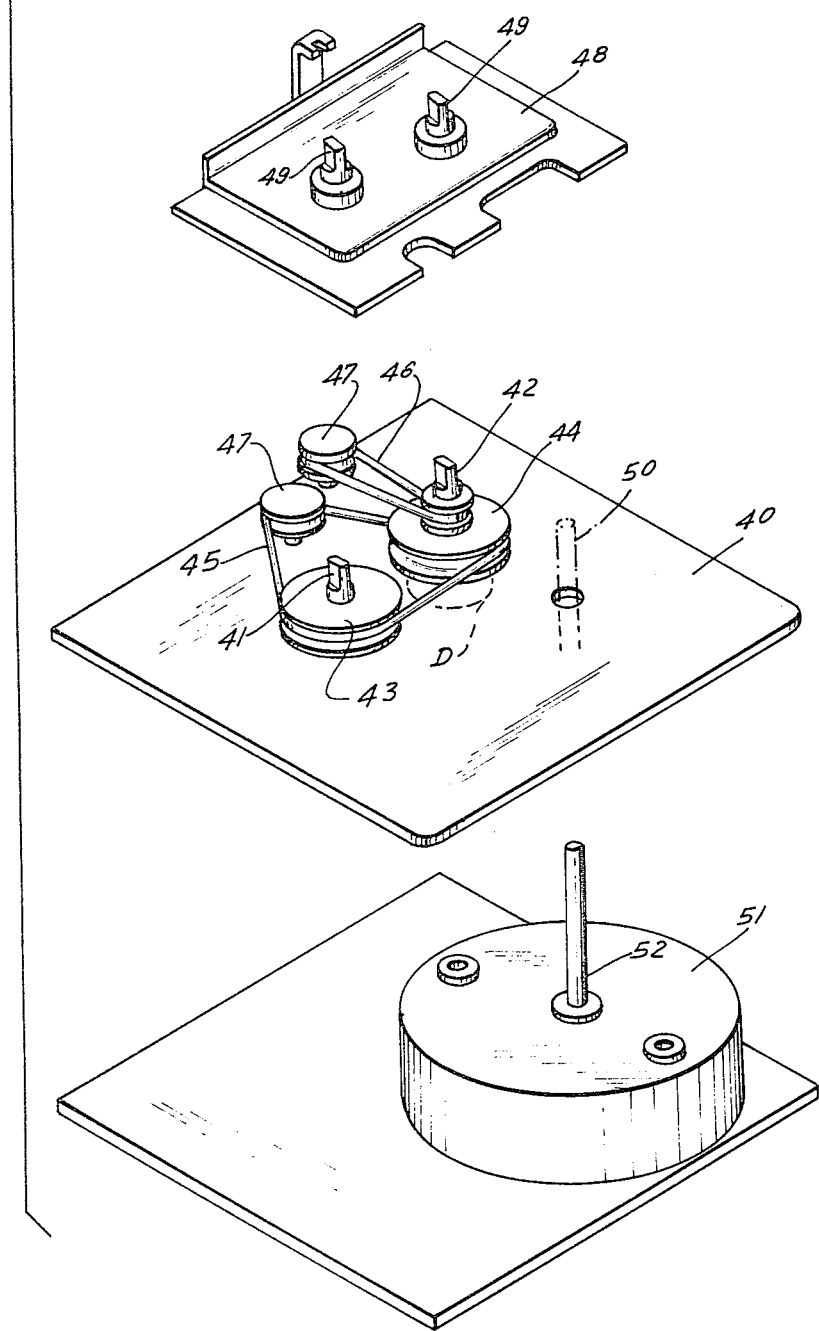

FRONT-LOADING CASSETTE TAPE MACHINE

BACKGROUND OF THE INVENTION

1. Field of the Invention

This invention relates to cassette tape machines, i.e., cassette recorders and/or players.

More particularly, the invention relates to front-loading cassette machines.

The invention also relates to a cassette machine wherein the tape capstan is direct-driven.

2. The Prior Art

Cassette recorders and/or players are becoming more and more popular because they are compact and extremely simple to use. Most of them have a recess in the upper surface of the housing, into which a cassette is inserted from above in flat position, i.e., with its major surfaces parallel to the surface having the depression. Many of the cassette machines are, however, intended for permanent installation, e.g., in a cabinet or the like, so that in such an event the upper side of the machine is not accessible.

To cope with this problem it has been proposed to provide front-loading cassette machines, in which the recess for the cassette is provided in the front face of the housing. The cassette, standing on one of its longer edges when installed, then has its major surfaces extending parallel to the front face of the housing. This creates a new problem since the machine now cannot be built any lower than the cassette is high in its installed position, whereas the trend is towards making these machines lower to give them a slimmer profile.

One proposal for allowing the use of cassettes with low-profile cassette machines whose upper surface is not accessible, is to insert the cassettes with a narrow side thereof into a slot provided in the front face of the machine, so as to extend parallel to the plane of the upper side of the housing. A drawback of this arrangement is that during insertion into the slot the cassette may move skew and become wedged in the slot, or may become otherwise jammed.

For cassette players used in automobiles it is known from German Published Application No. 2,729,835 to provide a drawer which pulls out of the housing and to place the cassette flat into this drawer from above. Another proposal (German Published Application No. 1,472,015) is for an automobile-type cassette machine to be portable, i.e., to be readily removable from a holder in the automobile, and to be insertable into a nest provided for this purpose in a home radio or the like, so that it can be used either in a car or at home and then makes use of the amplifier and speaker of the home radio.

The prior art arrangements have the usual indirect capstan drive, i.e., the type of drive in which the motor is indirectly coupled to the capstan by means of belts and/or rubber wheels. These indirect drive systems are prone to cause undesirable "wow" and "flutter" since fluctuations in the speed of rotation of the capstan (and hence in the speed of advancement of the tape past the tape heads are generally unavoidable. In many instances this is acceptable; however, especially in the higher-quality home sound systems a "concert hall" standard of fidelity is now being required which can not be met with indirect drives.

SUMMARY OF THE INVENTION

It is a general object of the invention to overcome the problems outlined above.

More particularly, it is an object of the invention to provide an improved cassette tape machine into which cassettes may be placed from above in flat position but which can nevertheless have an extremely low profile.

Another object of the invention is to provide such a cassette tape machine wherein the tape capstan is driven by a direct-drive arrangement, despite the extremely low profile of the machine.

In keeping with these objects, and with still others which will become apparent hereafter, one feature of the invention resides in a cassette tape machine, comprising a housing having an upper surface and a front panel provided with a cut-out; a drawer slidable into and out of the cut-out and provided with a receiver into which tape cassettes can be placed from above in flat position so as to have their major sides extend parallel to the upper surface; and a tape drive in the drawer and operative for advancing tape in a cassette located in the receiver.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a partly sectional front view of a machine embodying the invention;

FIG. 2 is a top plan view of the machine in FIG. 1, partly sectioned and with the cassette drawer shown in extended position;

FIG. 3 is a section taken on line III—III of FIG. 1;

FIG. 4 is an exploded perspective view, showing details of the cassette receiver of the embodiment in FIGS. 1–3;

DESCRIPTION OF THE PREFERRED EMBODIMENTS

Figure 5:
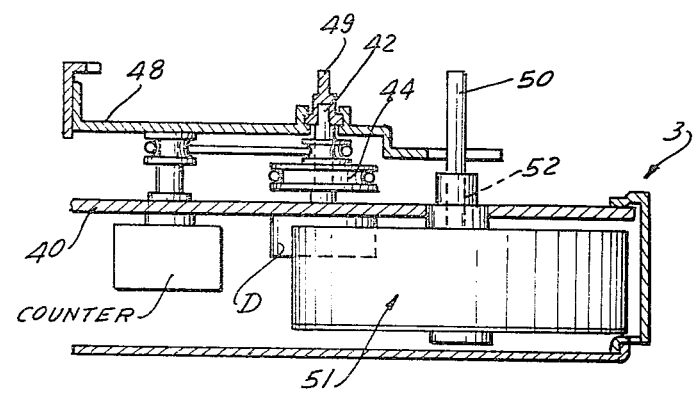
FIG. 5 is a fragmentary vertical section through FIG. 4 in non-exploded state.

Illustrated in FIGS. 1–3 is an exemplary embodiment of a cassette tape machine according to the present invention. The machine in toto is designated with reference numeral 1; its front face 2 is illustrated in FIG. 1 and will be seen to be provided with a receiver 3 (of drawer-like type, as more clearly seen in FIG. 2) for tape cassettes. The front face 2 is also provided with various operating controls; for example, a pushbutton 4 for switching power on or off, a turnable knob 5 for left-channel volume and a turnable knob 6 for right-channel volume. Additional controls may include pushbuttons 7 ("fecr") 8 ("Dolby nr"), 9 ("micro amplifier"), 10 ("memory") and 11 (in reserve). There are also two level indicators 12, 13 for the left and right channels, respectively; these may be meters or strings of sequentially energizable light-emitting diodes.

The front panel of the cassettes receiver 3 is provided with a mechanical or electronic tape-footage counter 14 and a reset button 15 for resetting the counter to zero.

There are further provided pushbuttons 16–22 which control other functions, e.g., the tape drive or the like and whose operative state may be indicated by energization of a respectively associated LED.

The controls mentioned above do not form part of the invention and, therefore, require no description of further details.

A portion of the front face 2 is broken away in FIG. 1, to show guide rails 23, 24 and the balls 25 of a ball bearing, for the tape receiver 3.

FIG. 2 shows the machine 1 in a top plan view, with the receiver 3 pulled out to its cassette loading and unloading position. A cassette 26 is shown in place, having its upper major surface extending parallel to the upper surface of the machine 1. Part of this upper surface is broken away, showing again the guide rails 23, 24 at one side of the receiver 3 (it will be appreciated that similar rails are provided at the other side) and illustrating that the receiver can be pushed into, and pulled out of, the machine 1 in drawer-like manner.

The side view in FIG. 3 is a section taken on line III—III of FIG. 1 and shows the chassis 28 (made e.g., as a pressure casting) and a cover 27 (of e.g., sheet steel). A circuit plate 29 (e.g., printed circuit) is mounted on the chassis 28. Again, one set of the guide rails 23, 24 for the receiver 3 is visible.

Unlike the prior art, the receiver 3 has the tape drive mechanism mounted directly in it, beneath a supporting plate for the cassette 26. The drive for the tape capstan is a direct-drive motor 30 coupled directly to the tape capstan; the spindle for the take-up hub (not shown) of the cassette 26 is driven by a separate D.C. motor, as known from the prior art. A plate 31 of glass or synthetic plastic material may be provided to slide across (or swing down over) the cassette 26 to protect the same against dust and other influences.

Figure 6:
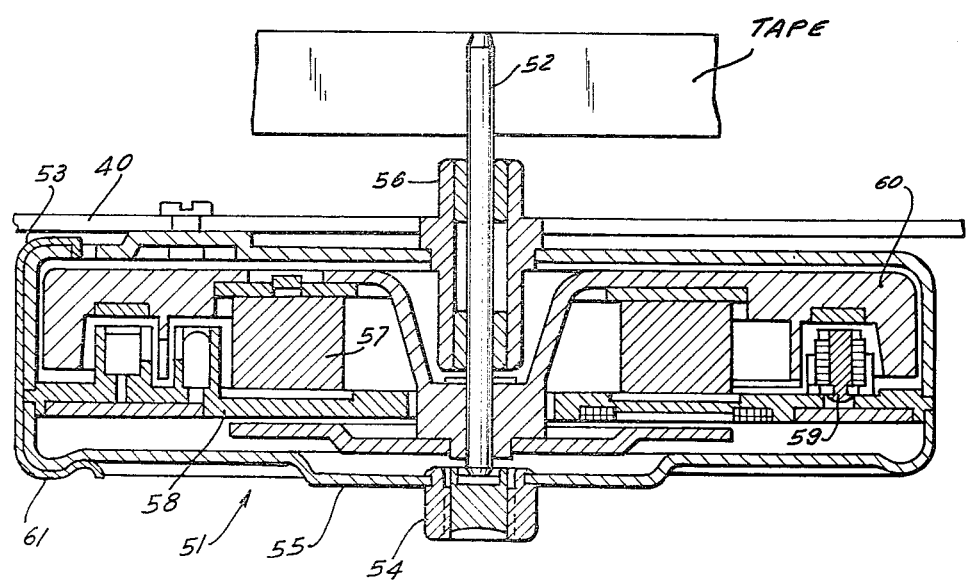
FIG. 6 is a partial vertical section through the direct drive shown in FIG. 5.

Details of the tape drive in the receiver 3 are illustrated in FIGS. 4–6.

Mounted in the receiver 3 is a plate 40 which carries the usual tape rotary spindles 41 and 42 which each enter into one of the tape hubs (not shown) of a tape cassette when the same is placed into the receiver. Since the direction of forward tape movement is conventionally from left to right, it is the spindle 42 which is the take-up spindle, i.e., which rotates the tape take-up hub of the cassette. Such spindles are conventionally driven by a D.C. motor, here illustrated only diagrammatically (and designated D) because it does not form part of the invention. The spindles 41, 42 may carry wheels or pulleys 43, 44 which rotate, via belts 45, 46 or similar instrumentalities, auxiliary rollers 47, e.g., rollers which operate a tape footage counter or the like. A cover plate 48 is mounted atop the plate 40 to protect and conceal the exposed components mentioned above. It may be provided with two rotary sleeves 49 having open lower ends (not shown) into which the spindles 41, 42 enter in motion-transmitting relationship, so that the sleeves 49 turn when the spindles rotate. Of course, it will then be the sleeves 49 which enter into the tape hub to turn the same. However, the plate 48 could simply have openings and the spindles 41, 42 could extend through these and engage the tape hubs directly.

Also mounted on the plate 40 is the tape capstan 50, i.e., the element which engages the tape in the cassette and which is responsible for advancing the tape past the heads (not shown) at a rate of speed which is as uniform as possible to eliminate wow and flutter. According to the invention this capstan 50 is driven by a direct-drive 51 which is also mounted in the receiver 3, beneath the plate 40, and which has an output shaft coupled with the capstan 50 in a manner known per se to make them rotate together, or which itself may be configurated as the capstan and in that case extend through an opening provided for it in the plate 40. The direct drive 51 is preferably mounted on the bottom of the receiver 3 and the plate 40 may be secured to it by screws, nuts or in any other suitable manner.

The advantage of using a direct drive 51 for the capstan 50 is, as mentioned before, that in this manner the rotation of the capstan is totally uniform and there are no fluctuations in the advancing speed of the tapes in the cassette placed into the receiver 3; this eliminates wow and flutter.

The drive 51 is shown in FIG. 6 in a partial axial section, it being understood that the part which is shown in elevation is mirror-symmetrical to the sectioned part, so that the sectioning of one part suffices for a proper understanding. The drive 51 has a housing 53 provided with a lower bearing 54 having a bearing plate 55, and an upper bearing 56. Mounted for rotation in these bearings 54, 56 is the rotor 57 having the output shaft 52. The winding of the stator is mounted in the housing 53 on a carrier ring 58 which, together with the winding, can be adjusted axially of the housing 53 by means of circumferentially distributed screws 59 and springs 60 (one of each shown). At the height of the winding the housing 53 is provided in its circumferential wall with a plurality of circumferentially spaced cut-outs (not shown) which are normally closed by a removable ring 61 that embraces the housing 53; the position of the winding can be visually observed through these openings and adjustments made with the screws 59. Outlet terminals are designated with reference numeral 62.

This direct drive 51 is quite flat in its construction and can, therefore, be readily accommodated in the receiver 3 beneath a cassette therein. The drive corresponds in its construction and operation to the one disclosed in German Published Application No. 1,463,839 which is incorporated by reference in its entirely herein.

It will be appreciated that it is the positioning of the capstan drive in the receiver 3 itself, which eliminates the need for motion-transmitting instrumentalities which, were the drive mounted elsewhere, would otherwise be needed to transmit motion to the capstan and would, in so doing, induce wow and flutter.

Various modifications may be made in the exemplary embodiment illustrated in the drawing, without thereby departing from the gist of the invention. For example, the capstan drive could be of a different type, such as the type disclosed in German Allowed Application No. 1,907,822 or in U.S. Pat. No. 4,072,874.

While the invention has been illustrated and described as embodied in a cassette tape machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cassette tape machine, comprising a housing having an upper surface and a front panel provided with a cut-out; a drawer slidably movable into and out of said cut-out and provided with a receiver into which tape cassettes can be placed from above in flat position so as to have their major sides extend parallel to said upper surface; a tape capstan adapted for advancing movement of a tape in said cassette and mounted in said receiver; and a direct-driver motor coupled with said capstan for driving the same and positioned in said drawer.

2. A cassette tape machine as defined in claim 1; and further comprising means mounting said drawer in said housing for sliding movement between an extended and a retracted position.

3. A cassette tape machine as defined in claim 2, said means comprising cooperating guide rails on said housing and drawer.

4. A cassette tape machine as defined in claim 1, wherein said drawer comprises a plate subdividing the drawer into an upper part provided with said receiver, and a lower part accommodating said direct-drive motor.

* * * * *